(12) United States Patent
Ishikawa (10) Patent No.: US 8,111,930 B2
(45) Date of Patent: Feb. 7, 2012

(54) IMAGE ENCODING APPARATUS AND DECODING APPARATUS, AND CONTROL METHOD THEREOF

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 12/109,555

(22) Filed: Apr. 25, 2008

(65) Prior Publication Data

US 2008/0285864 A1    Nov. 20, 2008

(30) Foreign Application Priority Data

Apr. 26, 2007  (JP) ................ 2007-117557

(51) Int. Cl.
*G06K 9/36* (2006.01)
*G06K 9/46* (2006.01)
*H04N 1/00* (2006.01)

(52) U.S. Cl. ........ 382/232; 382/173; 382/233; 382/239; 358/426.02; 358/426.12; 358/462

(58) Field of Classification Search .............. None
See application file for complete search history.

(56) References Cited

U.S. PATENT DOCUMENTS

| | | | | |
|---|---|---|---|---|
| 5,321,532 | A | 6/1994 | Ishikawa et al. | 358/534 |
| 5,465,173 | A | 11/1995 | Ishikawa et al. | 358/534 |
| 5,774,634 | A * | 6/1998 | Honma et al. | 358/1.9 |
| 5,818,970 | A | 10/1998 | Ishikawa et al. | |
| 5,903,360 | A | 5/1999 | Honma et al. | 358/450 |
| 5,926,292 | A | 7/1999 | Ishikawa et al. | 358/534 |
| 6,252,992 | B1 | 6/2001 | Ishikawa | 382/239 |
| 6,915,014 | B1 * | 7/2005 | Honma et al. | 382/239 |
| 2002/0041387 | A1 * | 4/2002 | Miyake et al. | 358/1.14 |
| 2003/0194138 | A1 * | 10/2003 | Osawa et al. | 382/233 |
| 2008/0037883 | A1 * | 2/2008 | Tsutsumi et al. | 382/232 |

FOREIGN PATENT DOCUMENTS

| | | |
|---|---|---|
| JP | 4-326669 | 11/1992 |
| JP | 4-326669 A | 11/1992 |
| JP | 10-108025 | 4/1998 |

OTHER PUBLICATIONS

Yi-Hsin Chen; Mintzer, F.; Pennington, K. "A binary representation of mixed documents (text/Graphic/Image) that compresses". ICASSP '86. 537-540.*
English translation of Japanese Patent Application JP 4326669.*

* cited by examiner

*Primary Examiner* — Li Liu
(74) *Attorney, Agent, or Firm* — Fitzpatrick, Cella, Harper & Scinto (57) ABSTRACT

This invention maintains pixels as a source of a high frequency component such as a character and generates the encoded data having a fixed length for one block. A block generator reads out image data of one block from image data. An extractor extracts a color of a pixel having high frequency component, and generates information identifying pixels of the extracted color and those of non-extracted color. A first encoder lossless-encodes the identification information. A detector detects the data size of the generated encoded data. A substitution unit calculates the average value of colors of the pixels having the non-extracted color, substitutes the color of the pixels having the extracted color by the average value. A second encoder encodes the pixels after the substitution. An adjustment unit adjusts the data size of the encoded data from the second encoder in accordance with the code size detected by the detector.

10 Claims, 9 Drawing Sheets

IMAGE ENCODING APPARATUS AND DECODING APPARATUS, AND CONTROL METHOD THEREOF

BACKGROUND OF THE INVENTION

1. Field of the Invention

The present invention relates to encoding and decoding techniques of an image.

2. Description of the Related Art

As a technique for compressing a multi-valued image including characters, line arts, and a natural image, Japanese Patent Laid-Open No. 4-326669 is known. As described in this reference, an inputted image is divided into blocks each as a unit of orthogonal transformation, a pixel which has a mode value that has a highest probability of occurrence in each block is assumed as that of a character or line arts, and pixel data of color information or density information of the mode value is extracted. The color of the mode value and information used to identify an extracted pixel and non-extracted pixels then undergo lossless encoding such as run-length encoding or the like. Also, the average value of non-extracted pixels in each block is calculated, and the value of the extracted pixel is substituted by the calculated average value, thus attaining lossy encoding such as JPEG or the like. Then, the lossless encoding result and lossy encoding result are combined and outputted.

As another technique for compressing a multi-valued image including characters, line arts, and a natural image, Japanese Patent Laid-Open No. 10-108025 or the like is known.

However, since the related art uses predictive encoding or variable-length encoding as encoding, encoded data can only be decoded in the same order as that upon encoding, and it is very difficult to attain manipulations such as random access and rotation processing for respective blocks. Alternatively, a manipulation for making data fall within a predetermined code size is complicated.

SUMMARY OF THE INVENTION

The present invention provides an encoding technique which solves the above problem. The present invention also provides an encoding technique which maintains pixels as a source of high frequency components such as characters, line arts, and the like, and sets an encoded data size per block as a fixed length.

In order to achieve the object, for example, an image encoding apparatus of the present invention comprises the following arrangement. That is, an image encoding apparatus for encoding image data, comprises:

an input unit adapted to input image data for respective blocks each defined by a plurality of pixels;

an extraction unit adapted to check if image data of each inputted block includes a pixel of a high frequency component, and to extract a color of that pixel as an extracted color;

a generation unit adapted to generate identification information used to identify pixels having the extracted color and pixels having non-extracted colors in the block;

a first encoding unit adapted to encode the generated identification information;

a calculation unit adapted to calculate substitution color data used to substitute pixel data having the extracted color based on pixel data of the non-extracted colors in the block;

a substitution unit adapted to substitute the pixel data having the extracted color by the substitution color data calculated by the calculation unit;

a second encoding unit adapted to encode image data of the block obtained by substitution of the substitution unit;

a detection unit adapted to detect a data size of encoded data generated by the first encoding unit;

a data size suppression unit adapted to suppress a data size of encoded data generated by the second encoding unit based on the data size detected by the detection unit; and a combining unit adapted to combine and output information of the extracted color, the encoded data generated by the first encoding unit, and the encoded data size obtained by the data size suppression unit.

According to the present invention, pixels as a source of high frequency components such as characters, line arts, and the like can be maintained, and an encoded data size per block can be set as a fixed length. Therefore, upon decoding, only a desired block can be randomly accessed and decoded.

Further features of the present invention will become apparent from the following description of exemplary embodiments with reference to the attached drawings.

DESCRIPTION OF THE EMBODIMENTS

Preferred embodiments according to the present invention will be described in detail hereinafter with reference to the accompanying drawings.

First Embodiment

Figure 1:
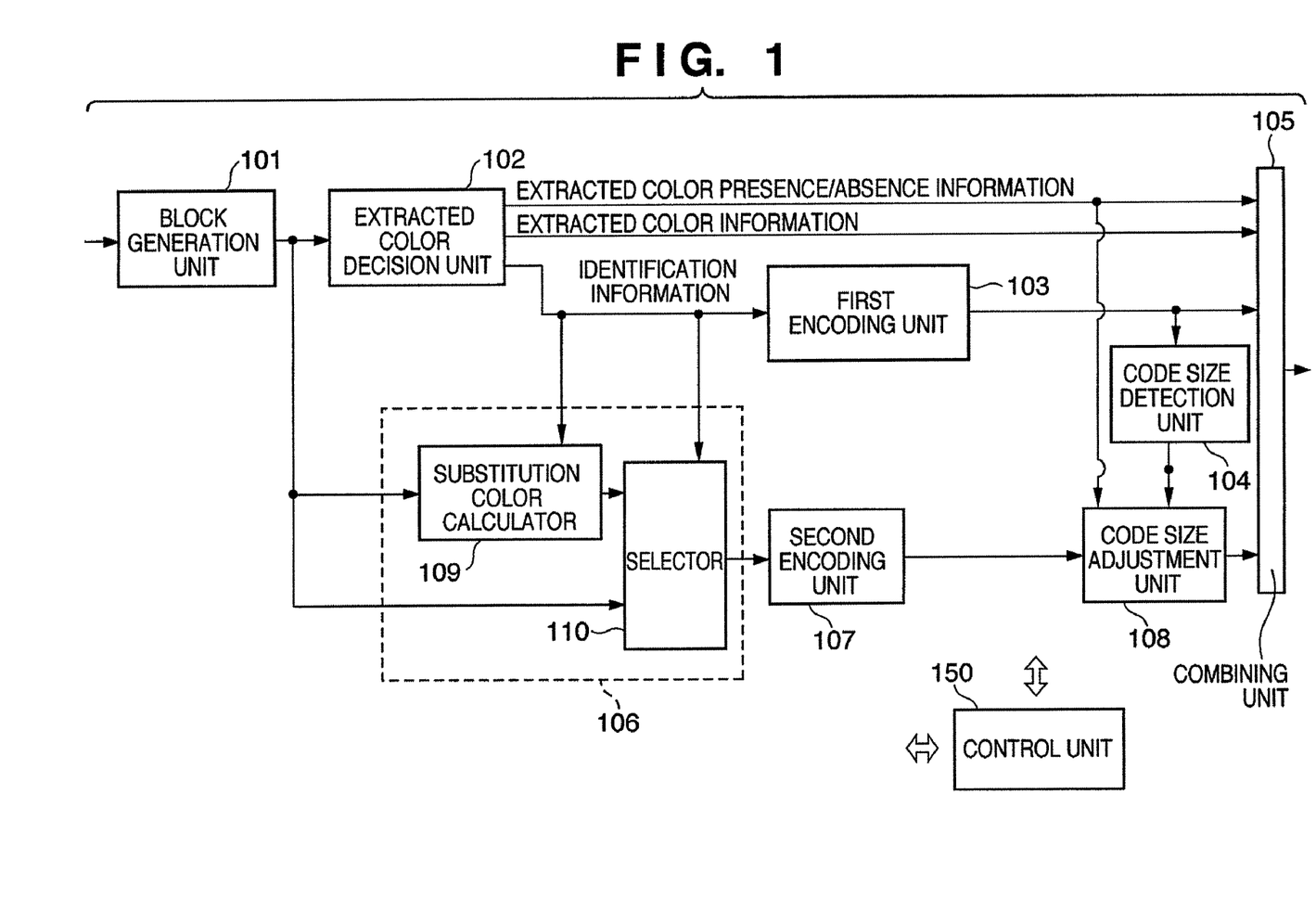
FIG. 1 is a block diagram showing the arrangement of an image encoding apparatus according to the first embodiment.

FIG. 1 is a block diagram showing the arrangement of an encoding apparatus according to the first embodiment of the present invention.

The encoding apparatus according to this embodiment comprises a control unit 150 which controls the overall apparatus, block generation unit 101, extracted color decision unit 102, first encoding unit 103, code size detection unit 104, combining unit 105, substitution unit 106, second encoding unit 107, and code size adjustment unit 108. Assume that since times required for processing of the respective processing units are different from each other, buffer memories for synchronization are connected before the respective processing units. The processing contents in the arrangement shown in FIG. 1 will be described below.

The block generation unit 101 inputs multi-valued image data to be encoded for respective blocks each defined by a plurality of pixels (n×m pixels), and outputs inputted blocks to the subsequent units. In this embodiment, each pixel of the image data to be encoded is defined by R, G, and B components, and each component is expressed by 8 bits (256 tones), for the sake of simplicity. Also, one block has a size of 8×8 pixels. The block generation unit 101 outputs R component block data, G component block data, and B component block data in turn. However, the type of color components is not limited to RGB but it may be YMC, and the number of components and the number of bits are not limited to them.

The extracted color decision unit 102 checks if image data in an inputted block (8×8) of one color component includes a pixel corresponding to a high frequency component, extracts and outputs the color of that pixel as an extracted color, and outputs binary data used to identify a pixel having the extracted color and that having a non-extracted color. If this binary data is "1", the pixel of interest has the extracted color; if it is "0", the pixel of interest has the non-extracted color. In this embodiment, since one block is defined by 8×8 pixels, the extracted color decision unit 102 generates 8×8 binary data. This binary data will be referred to as identification information hereinafter since it is data indicating that each pixel has the extracted color or non-extracted color.

An example of an algorithm for obtaining the extracted color and identification information by the extracted color decision unit 102 will be described below.

The extracted color decision unit 102 calculates the average value of pixels in one block. The extracted color decision unit 102 classifies the pixels into a pixel group having values larger than the average value (to be referred to as a first pixel group hereinafter) and that having values equal to or smaller than the average value (to be referred to as a second pixel group hereinafter). Furthermore, the extracted color decision unit 102 calculates the average value of the first pixel group (first average value) and that of the second pixel group (second average value), and checks if the absolute value of the difference between these two average values exceeds a predetermined threshold.

If the absolute value of the difference between the first and second average values exceeds the threshold, the extracted color decision unit 102 notifies the combining unit 105 of extracted color presence/absence information indicating that the block of interest includes an extracted color. Then, the extracted color decision unit 102 decides the second pixel group as those having an extracted color, and outputs their color information to the combining unit 105 as extracted color information. Furthermore, the extracted color decision unit 102 outputs identification information which assumes "1" at the position of a pixel having the extracted color or "0" at the position of a pixel having the non-extracted color to the first encoding unit 103 and substitution unit 106. Assume that the extracted color decision unit 102 outputs pieces of identification information in the raster scan order.

On the other hand, if the absolute value of the difference between the first and second average values is equal to or smaller than the threshold, the extracted color decision unit 102 notifies the combining unit 105 of extracted color presence/absence information indicating that the block of interest does not include any extracted color. The extracted color decision unit 102 outputs all pieces of identification information="0". In this case, the extracted color decision unit 102 may not output extracted color information. This is because upon reception of the extracted color presence/absence information indicating the absence of an extracted color, the combining unit 105 ignores the extracted color information from the extracted color decision unit 102.

The processing contents of the extracted color decision unit 102 have been explained. However, it should be noted that such processing contents are merely an example. Details will be apparent from a description to be given later, and the extracted color decision unit 102 can extract a high frequency component in the block of interest.

The first encoding unit 103 encodes the identification information of 8×8 (=64) bits outputted from the extracted color decision unit 102, and outputs the encoded data to the combining unit 105. In this embodiment, the first encoding unit 103 comprises, e.g., a runlength encoding unit, but the type of encoding is not limited to this. When the data size obtained by encoding the identification information is 64 bits or more, the first encoding unit 103 outputs the identification information from the extracted color decision unit 102 intact in place of the encoded data. Hence, the first encoding unit 103 stores an identification bit (1 bit) indicating whether or not to encode information at the head position of the encoded data of the identification information. That is, the data size of the encoded data of the identification information generated by the first encoding unit 103 is 65 bits at a maximum.

The code size detection unit 104 detects the encoded data size (the number of bits) of the identification information for one block outputted from the first encoding unit 103, and outputs the detection result to the code size adjustment unit 108. Details of the code size adjustment unit 108 will be described later.

The substitution unit 106 will be described below. A substitution color calculator 109 in the substitution unit 106 calculates the average values of the respective components of pixels (those of the non-extracted colors) with the identification information "0", and outputs a color represented by the calculated average values of the respective color components to a selector 110 as substitution color data. More specifically, let $P(x, y)$ be the value of a certain color component at the position of coordinates $(x, y)$ ($x, y=0, 1, \ldots, 7$) of the block of interest, $I(x, y)$ (=0 or 1) be the identification information, and N be the number of pieces of identification information "0" in the block of interest. Then, an average value Ave of one component is given by:

$$\text{Ave}=\Sigma\Sigma P(i,j)\times(1-I(i,j))/N$$

where $\Sigma\Sigma$ is a summation function within the range in which variables i and j can assume (0 to 7). This calculation is repeated as many as the number of components.

The substitution color calculator 109 outputs the calculated Ave of the respective color components as substitution color data to the selector 110. When the number of pieces of identification information "0" is zero, i.e., when N=0, the substitution color calculator 109 may skip the above calculation, and may output an appropriate value. This is because when N=0, the selector 110 selects and outputs 64 pixel data from the block generation unit 101.

When identification information is "1", the selector 110 selects the substitution color data Ave outputted from the substitution color calculator 109; when the identification information is "0", the selector 110 selects and outputs pixel data from the block generation unit 101.

Figure 2:
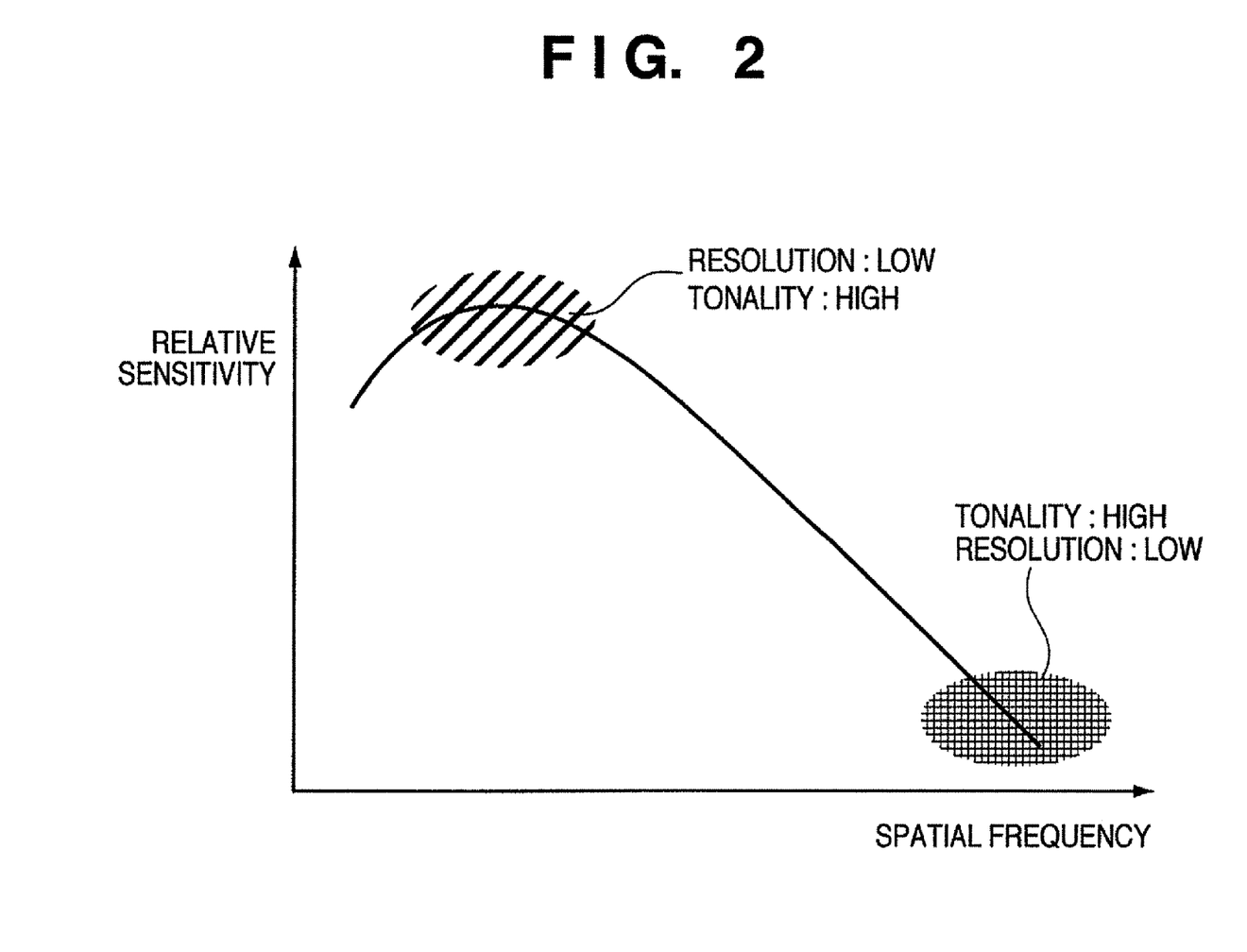
FIG. 2 is a graph showing the relationship between the spatial frequency of an image and human visual sensitivity.

FIG. 2 shows the relative relationship between the spatial frequency of an image and human visual sensitivity. As shown in FIG. 2, in general, an image with a high spatial frequency has low human visual sensitivity, and its tonality may be low. On the other hand, a region with a low spatial frequency has high relative sensitivity, and its tonality becomes important. Put differently, a character or line art is desired to be an image which has a sharp edge and a high spatial frequency. On the other hand, a natural image can have a low spatial frequency, and is desired to have high tonality.

In fact, the substitution unit 106 of this embodiment substitutes the values of the respective components of pixels determined to be the extracted color by the average value of the pixels of the non-extracted colors, and outputs the substitution result to the second encoding unit 107. As a result, an image of a block of 8×8 pixels outputted from the substitution unit 106 is converted into an image with a low spatial frequency.

The second encoding unit 107 is, for example, a JPEG encoding unit (DCT transformation, quantization, entropy encoding), encodes halftone (continuous tone) image data of 8×8 pixels outputted from the substitution unit 106 by JPEG, and outputs the generated encoded data to the code size adjustment unit 108. The second encoding unit 107 outputs encoded data of one DC component, and encoded data of 63 AC components in this order. The scan order upon encoding the AC components is a zigzag scan from the lower to higher frequencies.

The code size adjustment unit 108 serves as data size suppression means of the encoded data of the halftone image data outputted from the second encoding unit in accordance with the encoded data size of the identification information outputted from the code size detection unit 104. The code size adjustment unit 108 sets the encoded data size per block to be a fixed length which suffers less deterioration of image quality.

Figure 3:
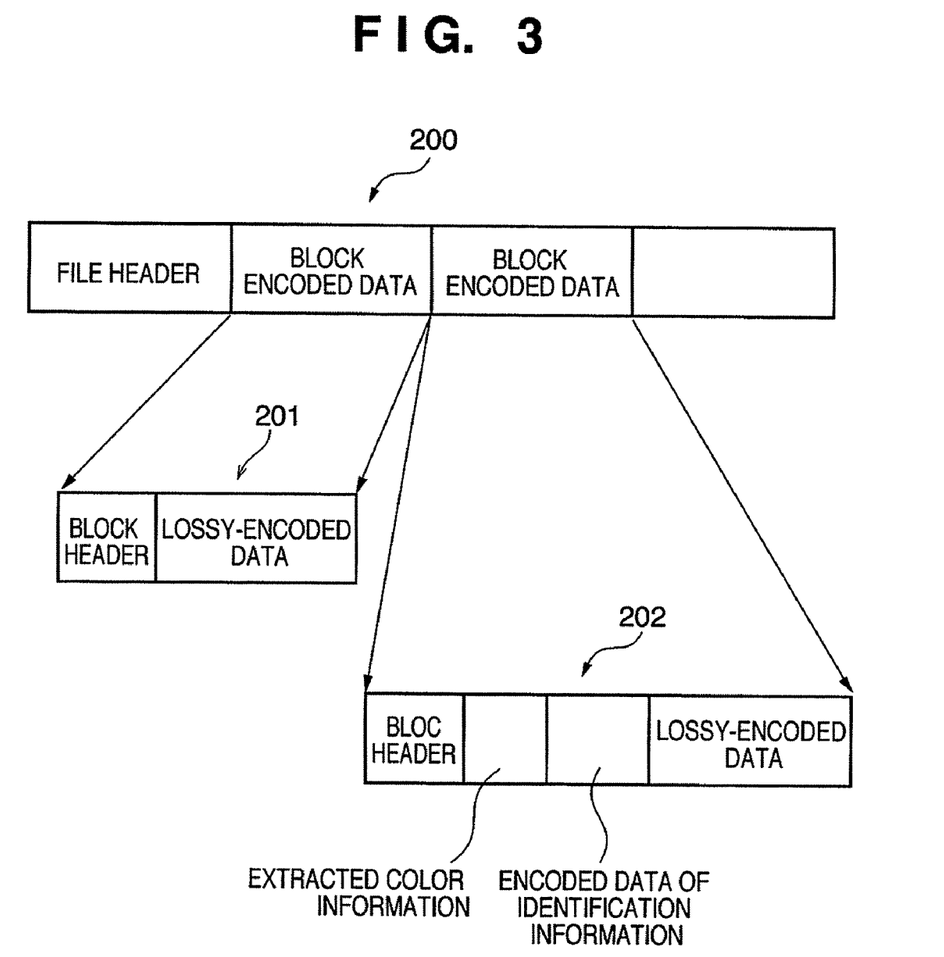
FIG. 3 is a view showing the structure of an encoded data file generated by the image encoding apparatus according to the first embodiment.

FIG. 3 shows the structure of an image data file 200 including encoded data outputted from the combining unit 105 of the image encoding apparatus. In this embodiment, encoded data of one block is that of one color component. Therefore, the encoded data of continuous three blocks represent the encoded data of one block of a color image.

The combining unit 105 generates and outputs a file header prior to outputting the encoded data. The file header includes the image size (the numbers of pixels in the horizontal and vertical directions), information that specifies a color space, and information required for decoding processing such as the number of bits that express each color component, the data length of the encoded data for one block, and the like. As shown in FIG. 3, the encoded data of each block is either of types 201 and 202. Encoded data 201 indicates the data structure with an extracted color absent, and encoded data 202 indicates that with an extracted color present. The data structure for one block with an extracted color absent includes a block header storing information indicating the absence of the extracted color, and the encoded data of a halftone image generated by the second encoding unit 107. That is, this data structure does not include any encoded data of identification information. On the other hand, the encoded data 202 includes a block header storing information indicating the presence of the extracted color, extracted color information, encoded data of identification information, and encoded data of a halftone image. The encoded data 201 and 202 both have the same data length.

Assume that the block header is 1 bit since it needs to store information indicating the presence/absence of an extracted color. The extracted color information is expressed by 8 bits. The encoded data size of the identification information is 65 bits at a maximum, as described above. The most important data of the encoded data of a halftone image generated by the second encoding unit 107 is the encoded data of the DC component. In JPEG, the difference between this DC component and that of the immediately preceding block is normally encoded. However, since this DC component needs to be decoded without information of surrounding blocks in this embodiment, if an initial value of DPCM is 128 and a DC component after quantization ranges from 0 to 255, their difference ranges from −127 to 128, a total of 14 bits (=6 Huffman bits+8 additional bits) is maximum. Hence, as a code length per block, if 1+8+65+14=88 bits, the resolution in a block can be preserved, while reproduction using two or more colors can be realized. Hence, this embodiment sets the fixed length per block to be 88 bits. Therefore, the total data size of the encoded data of the identification information and halftone image is 88−9=79 bits.

On the other hand, in case of the absence of an extracted color, since the data structure includes the header+encoded data of halftone data, 87 bits can be used for the encoded data of a halftone image.

Therefore, the code size adjustment unit 108 of this embodiment executes the following processing.

1. When extracted color presence/absence information indicates presence of extracted color:

Let Cp be the code size (the number of bits) of identification information from the code size detection unit 104. The code size adjustment unit 108 outputs "79−Cp" bits from the head of encoded data outputted from the second encoding unit 107 to the combining unit 105. When the encoded data of one symbol outputted from the second encoding unit 107 extends over the "79−CP"-th bit, the bits up to that position are outputted. Decoding can be made while considering data to be decoded as fixed-length data, and if data to be decoded is not complete encoded data, it can be ignored.

2. When extracted color presence/absence information indicates absence of extracted color:

The code size adjustment unit 108 outputs 87 bits from the head of encoded data outputted from the second encoding unit 107 to the combining unit 105. When encoded data for one block outputted from the second encoding unit 107 is less than 87 bits, the code size adjustment unit 108 can append dummy data to output 87 bits.

The processing contents of the combining unit 105 of this embodiment will be described below.

The combining unit 105 generates and outputs the file header prior to the beginning of encoding, as described above. The subsequent processing of the combining unit 105 is as follows.

When the extracted color presence/absence information from the extracted color decision unit 102 indicates the presence of an extracted color, the combining unit 105 outputs a block header indicating the presence of the extracted color, extracted color information, encoded data of identification information from the first encoding unit 103, and encoded data of a halftone image from the code size adjustment unit 108 in this order.

On the other hand, when the extracted color presence/absence information from the extracted color decision unit 102 indicates the absence of an extracted color, the combining unit 105 outputs a block header indicating the absence of the extracted color, and encoded data of a halftone image from the code size adjustment unit 108 in this order.

Figure 4:
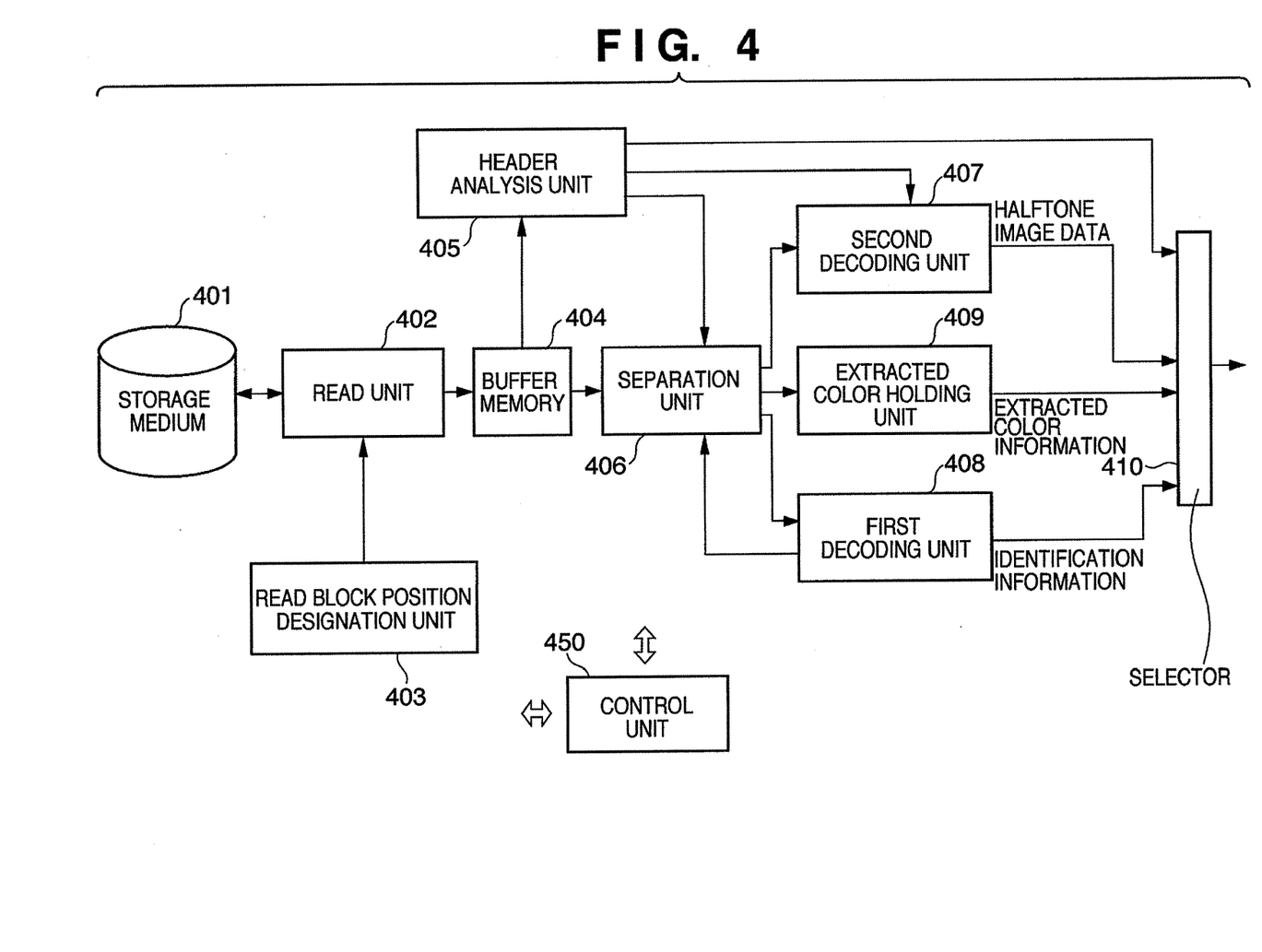
FIG. 4 is a block diagram showing the arrangement of an image decoding apparatus according to the first embodiment.

An image decoding apparatus which receives and decodes an encoded data file shown in FIG. 3 will be described below. FIG. 4 is a block diagram showing the arrangement of an image decoding apparatus of this embodiment. This image decoding apparatus comprises a control unit 450 which controls the overall apparatus.

A storage medium 401 stores an encoded image data file generated by the aforementioned encoding apparatus. The type of the storage medium 401 is not particularly limited. For example, a hard disk, RAM, memory card, and the like may be used. A reading unit 402 reads out encoded block data designated by a read block position designation unit 403 from the storage medium, and stores the readout encoded block data in a buffer memory 404. This read block position designation unit 403 reads out a storage address of block data to be read out, and outputs the storage address to the reading unit 402 under the control of the control unit 450.

For the sake of simplicity, assume that image data to be decoded has W blocks in the horizontal direction, and H blocks in the vertical direction. That is, upon converting into the number of pixels, the number of pixels in the horizontal direction is W×8, and that in the vertical direction is H×8. As is apparent from the above description of the processing of the image encoding apparatus, the encoded data length per block is fixed (88 bits in this embodiment).

The coordinate position of the upper left corner block of an image is defined as (0, 0). Assume that the control unit 450 instructs the read block position designation unit 403 to read out a block at an i-th ($0 \leq i \leq W-1$) position in the horizontal direction (right direction) and j-th ($0 \leq j \leq H-1$) position in the vertical direction (down direction). In this case, the read block position designation unit 403 calculates a read address Adrs by:

Adrs=size (the number of bits) of file header+(j×W+ i)×88×3

The reason why "3" is multiplied at the end of the above equation is to decode one block of a color image using encoded data for three blocks (three color components).

The read block position designation unit 403 sets the calculated address Adrs in the reading unit 402 as a read start address, and also "264 (=88×3)" as the read data size (the number of bits) in the reading unit 402.

As a result, the reading unit 402 reads out data of the data size (264 bits in this embodiment) corresponding to the fixed length from the bit position of the address Adrs from the head of the file to be encoded, and stores the readout data in the buffer memory 404. Upon decoding the entire image, the control unit 450 can update variables i and j in the raster scan order, and can set them in the read block position designation unit 403.

When the encoded data is stored in the buffer memory 404, a header analysis unit 405 analyzes the block header to acquire the extracted color presence/absence information. The header analysis unit 405 outputs the extracted color presence/absence information to a separation unit 406 and selector 410.

When the inputted extracted color presence/absence information indicates the absence of an extracted color, the separation unit 406 determines that data which follows the block header in the buffer 404 is encoded data of a halftone image, and outputs that encoded data to a second decoding unit 407.

When the inputted extracted color presence/absence information indicates the presence of an extracted color, the separation unit 406 determines that the first 8 bits of data which follows the block header in the buffer 404 is extracted color information, and outputs the 8-bit data to an extracted color holding unit 409 to make the unit 409 hold the outputted data. The separation unit 406 then determines that encoded data which follows the extracted color information is encoded data of identification information, and outputs that data to a first decoding unit 408.

The first decoding unit 408 analyzes the first bit to check if the encoded data is runlength-encoded or non-compressed data. If it is determined that the encoded data is runlength-encoded, the first decoding unit 408 decodes the runlength-encoded data to output and generate identification information of 64 bits (=8×8). If it is determined that the data is non-compressed data, the first decoding unit 408 determines that inputted 64 bits are identification information of 8×8 pixels, and outputs these bits intact. In either case, upon outputting the 64-bit identification information, the first decoding unit 408 notifies the separation unit 406 of completion of decoding.

Upon reception of this notification, the separation unit 406 determines that encoded data which are stored in the buffer 404 from the next bit position to be read out to the end position of the fixed length are encoded data of halftone image data of one component of 8×8 pixels, and outputs these data to a second decoding unit 407.

The second decoding unit 407 determines that the encoded data inputted via the separation unit 406 are arranged in the order of a DC components and AC components, and applies entropy decoding, dequantization, and inverse DCT transformation to the encoded data to reclaim and output halftone image data of a certain color component of 8×8 pixels. However, data to be decoded is up to the end position of the fixed length, and if encoded data at the end position does not form a complete codeword, the second decoding unit 407 executes decoding while ignoring that encoded data.

The selector 410 receives the extracted color presence/absence information from the header analysis unit 405, the decoding result data from the first and second decoding units 408 and 407, and the extracted color information from the extracted color information holding unit 409, and executes selection & output processing according to the following conditions.

<When Extracted Color Presence/Absence Information from Header Analysis Unit 405 Indicates Absence of Extracted Color>

The selector 410 selects all the 8×8 decoded pixel data from the second decoding unit 407 and outputs the selected data.

<When Extracted Color Presence/Absence Information from Header Analysis Unit 405 Indicates Presence of Extracted Color>

The selector 410 selects, at a pixel position where the identification information is "1", the extracted color information from the extracted color holding unit 409, and outputs the selected information. The selector 410 selects, at a pixel position where the identification information is "0", pixel data at the corresponding position of the 8×8 pixels decoded by the second decoding unit 407, and outputs the selected pixel data.

By repeating the aforementioned processing three times, an image for one block of the three components R, G, and B can be decoded.

As described above, according to this embodiment, a pixel that requires a resolution is decided from a block, and its color is extracted. Then, identification information used to identify a pixel having the extracted color and that having a non-extracted color is encoded. The values of the pixels having the extracted color are substituted by a substitution color calculated from the pixels of the non-extracted colors, and a tone image after substitution is JPEG-encoded. As a result, since a halftone image is equivalent to an image including only a natural image having a low spatial frequency, the image quality and code size of that image fall within ranges equivalent to those of a normal natural image. In addition, according to this embodiment, the encoded data size of one block is the fixed length. Therefore, a block at an arbitrary position can be decoded, and an image of that block can be rotated.

In the description of this embodiment, one block has a size of 8×8 pixels, and the block fixed length is 88 bits. However, these numerical values do not limit the present invention. The user may appropriately select these numerical values, and the control unit 150 may set these values.

Modification of First Embodiment

An example of implementing the first embodiment by a computer program will be described below as a modification of the first embodiment.

Figure 5:
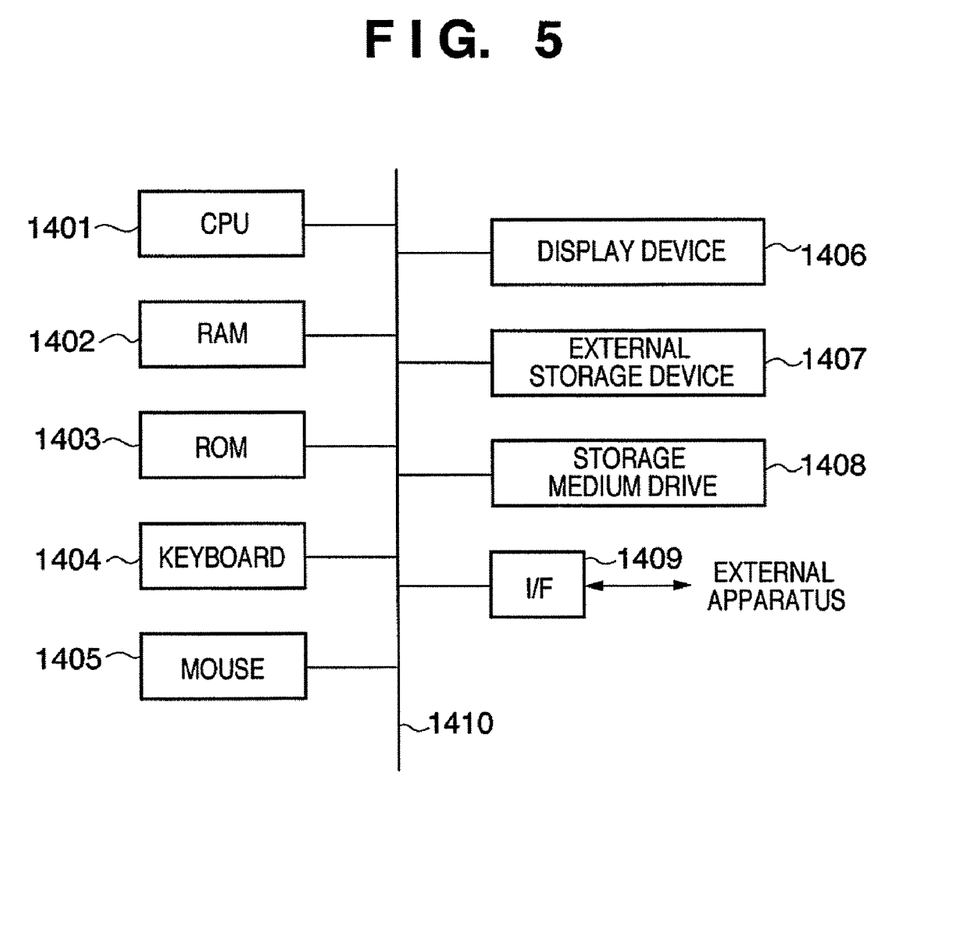
FIG. 5 is a block diagram showing the arrangement of a computer when the first embodiment is implemented by a computer program.

FIG. 5 is a block diagram showing the arrangement of an information processing apparatus (e.g., a personal computer) according to this modification.

In FIG. 5, reference numeral 1401 denotes a CPU, which controls the overall apparatus using programs and data stored in a RAM 1402 and ROM 1403, and executes application programs of image encoding processing and decoding processing to be described later. Reference numeral 1402 denotes a RAM which comprises an area for storing programs and data which are read out from an external storage device 1407 or storage medium drive 1408, or are downloaded from an external apparatus via an I/F 1409. The RAM 1402 also comprises a work area used when the CPU 1401 executes various kinds of processing. Reference numeral 1403 denotes a ROM which stores a boot program, and setting programs and data of this apparatus. Reference numerals 1404 and 1405 respectively denote a keyboard and mouse. The user can input various instructions to the CPU 1401 using these keyboard 1404 and mouse 1405.

Reference numeral 1406 denotes a display device, which comprises a CRT, liquid crystal display, or the like, and can display information such as images, characters, and the like. Reference numeral 1407 denotes a large-capacity external storage device such as a hard disk drive or the like. The external storage device 1407 saves, an OS (operating system), programs for image encoding processing and decoding processing to be described later, image data to be encoded, encoded data of images to be decoded, and the like as files. The CPU 1401 loads these programs and data onto a predetermined area on the RAM 1402, and executes them.

Reference numeral 1408 denotes a storage medium drive, which reads out programs and data recorded in a storage medium such as a CD-ROM, DVD-ROM, or the like, and outputs the readout programs and data to the RAM 1402 or external storage device 1407. Note that this storage medium may record programs for image encoding processing and decoding processing, image data to be encoded, encoded data of images to be decoded, and the like. In this case, the storage medium drive 1408 loads these programs and data onto a predetermined area on the RAM 1402 under the control of the CPU 1401.

Reference numeral 1409 denotes an I/F. With this I/F 1409, an external apparatus can be connected to the apparatus of this modification to allow data communications between these apparatus. For example, the I/F 1409 can input image data to be encoded, encoded data of images to be decoded, and the like to the RAM 1402, external storage device 1407, or storage medium drive 1408. Reference numeral 1410 denotes a bus which interconnects the aforementioned units.

In the above arrangement, when the power switch of this apparatus is turned on, the CPU 1401 loads the OS from the external storage device 1407 onto the RAM 1402 in accordance with the boot program in the ROM 1403. As a result, inputs from the keyboard 1404 and mouse 1405 are allowed, and a GUI can be displayed on the display device 1406. When the user issues a launch instruction of an image processing application program stored in the external storage device 1407 by operating the keyboard 1404 and mouse 1405, the CPU 1401 loads that program onto the RAM 1402 and executes the loaded program. As a result, this apparatus serves as an image processing apparatus.

The image encoding processing sequence upon executing that program will be described below with reference to the flowchart of FIG. 6.

Note that an example in which image data to be encoded is a color image data file stored in the external storage device 1407, and the encoding result is stored as a file in the external storage device 1407 will be explained below. However, the types of a generation source of image data to be encoded and an output destination of the encoding result are not particularly limited. For example, the generation source of the image data to be encoded may be an image scanner, and the output destination may be a network. In the following description, assume that various buffers and required various tables (including a Huffman table) are assured in a memory such as the RAM 1402 and the like. Also, assume that the image data to be encoded includes W blocks in the horizontal direction, and H blocks in the vertical direction. Furthermore, variables x and y indicate coordinates required to specify a pixel block.

In step S1, the CPU 1401 analyzes the header of an image data file to be encoded, and generates and outputs the header of a file to be encoded and outputted. In this case, the header of the output file includes information required upon decoding such as the size (the number of pixels in the horizontal direction and that in the vertical direction) of the image data, the type of color space, the number of bits of each component, the block size, the block fixed length, and the like. Upon encoding image data from an image scanner, the numbers of pixels in the horizontal and vertical directions can be calculated based on an original size, and the scan resolution of the image scanner. Encoded data generated by the subsequent encoding processing is stored to follow the generated header.

The CPU 1401 initializes a variable y to "0" in step S2, and a variable x to "0" in step S3.

In step S4, the CPU 1401 loads color image data (8×8 pixel data) for one block designated by coordinates (x, y) from the image data to be encoded in the external storage device 1407. In step S5, the CPU 1401 applies color extraction processing to one color component in the loaded block. The color extraction algorithm is as has been explained in the first embodiment.

In step S6, the CPU 1401 generates extracted color presence/absence information based on the color extraction result, and outputs the generated information as a block header.

The process advances to step S7, and the CPU 1401 checks if the color extraction has succeeded, i.e., if the block of interest includes a pixel having an extracted color. If it is determined that no pixel having a color to be extracted is found, the process jumps to step S12.

On the other hand, if it is determined that a pixel having an extracted color is found, the process advances to step S8, and the CPU 1401 outputs its extracted color. Subsequently, the CPU 1401 generates identification information (64 bits) which assumes "1" at the position of a pixel having the extracted color and "0" at the position of a pixel having a non-extracted color, and encodes and outputs the identification information in step S9. In this case, if the encoded data of the identification information exceeds 64 bits, the CPU 1401 appends an identification bit indicating non-encoding to the head of the generated identification information, and outputs the generated identification information intact. On the other hand, if the encoded data of 64 bits or less is generated, the CPU 1401 appends an identification bit indicating that data has been encoded to the head of the encoded data, and then outputs the encoded data.

In step S10, the CPU 1401 calculates the average value of pixel data to be determined to have non-extracted colors, thereby calculating substitution color information. In step S11, the CPU 1401 generates data for one component of 8×8 pixels by substituting pixel data having the extracted color by the substitution color information, and the process then advances to step S12.

In step S12, the CPU 1401 executes encoding processing of a halftone image. If the process jumps to step S12 since NO is determined in step S7, data to be encoded is halftone image data of the inputted block. If the process advances from step S11 to step S12, data to be encoded is halftone image data after the substitution processing.

In step S13, the CPU 1401 adjusts the encoded data size of the halftone image data. If NO is determined in step S7, the CPU 1401 sets (enables) 87 bits from the head of the encoded data of the halftone image data as data to be outputted, and discards (ignores) the subsequent bits. If YES is determined in step S7, the CPU 1401 calculates the encoded data size of the halftone image data to be outputted by:

$$89 - \{\text{encoded data size of extracted color} + \text{encoded data size of identification information}\}$$

Then, the CPU 1401 sets bits specified by the calculated value from the head of the encoded data of the halftone image data as data to be outputted, and discards the subsequent bits.

If the process advances to step S12, since the presence/absence of an extracted color and the code size of the identification information have already been determined upon encoding a halftone image, the CPU 1401 may interrupt encoding processing of the halftone image when it generates encoded data of a symbol exceeding the fixed length during the encoding processing.

In step S14, the CPU 1401 outputs the encoded data of the halftone image data of the number of bits decided as data to be outputted.

After that, the process advances to step S15, and the CPU 1401 checks if the encoded data of all the color components of the block of interest have been outputted. If NO is determined in step S15, the process returns to step S5 to generate and output encoded data of another color component.

On the other hand, if it is determined that the encoding and output processes of all the color components of the block of interest are complete, the process advances to step S16, and the CPU 1401 increments the variable x by "1". In step S17, the CPU 1401 compares the variable x with the number W of blocks in the horizontal direction to check if x<W. If it is determined that x<W, the CPU 1401 repeats the processes in step S4 and subsequent steps.

If it is determined in step S17 that x=W, the CPU 1401 increments the variable y by "1" in step S18. In step S19, the CPU 1401 compares the variable y with the number H of blocks in the vertical direction to check if y<H. If it is determined that y<H, the CPU 1401 repeats the processes in step S3 and subsequent steps.

If it is determined in step S19 that y=H, since this means that the encoding processing of all the blocks is complete, the CPU 1401 ends this encoding processing.

As described above, according to this modification, the same processing as the image encoding apparatus according to the aforementioned first embodiment can be implemented by the computer program, and the same effects can be provided.

Figure 7:
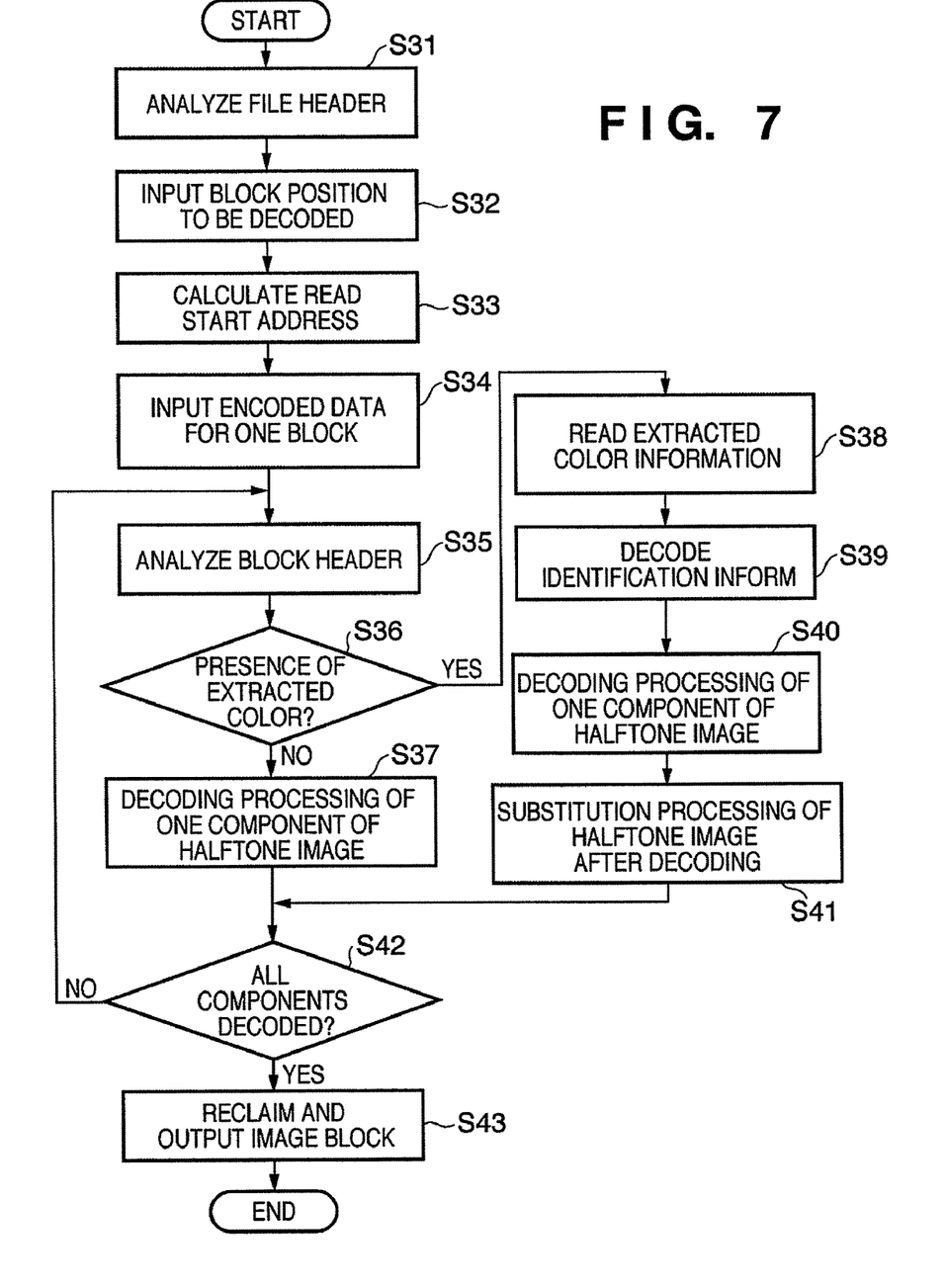
FIG. 7 is a flowchart showing the processing sequence of the image decoding apparatus.

The processing sequence of a computer program used to decode encoded image data will be described below with reference to the flowchart of FIG. 7. Note that the user has already selected an encoded image data file stored in the external storage device 1407 using a GUI (not shown).

In step S31, the CPU 1401 analyzes the header of the selected encoded image data file and acquires information required for decoding. This information includes fixed length information of encoded data for one block.

In step S32, the CPU 1401 inputs a block position to be decoded. The user may designate the block position to be inputted, or block position information to be decoded may be stored in advance as a file, and the block position may be inputted by loading that file.

In step S33, the CPU 1401 calculates a read start address of the block of interest based on the inputted block position and the size of the image to be decoded (this calculation method is the same as that in the first embodiment). In step S34, the CPU 1401 loads encoded data of 3×fixed length bits (for three blocks) from the calculated address position.

In step S35, the CPU 1401 analyzes the block header of the loaded encoded data for one block, and acquires extracted color presence/absence information. The CPU 1401 checks in step S36 if the extracted color presence/absence information indicates the presence of an extracted color.

If it is determined that the extracted color presence/absence information indicates the absence of an extracted color, the process jumps to step S37. In this case, the CPU 1401 determines that the encoded data that follows the block header is lossy encoded data of halftone image data, and executes lossy decoding (JPEG decoding in the embodiment). If the encoded data during the decoding processing exceeds the bit position indicated by the fixed length, the CPU 1401 determines that data after that encoded data is a value of encoded data with a quantized value "0", and decodes that data.

On the other hand, if it is determined in step S36 that the extracted color presence/absence information indicates the presence of an extracted color, the process advances to step S38, and the CPU 1401 loads 8-bit data which follows the block header as extracted color information (one of R, G, and B). In step S39, the CPU 1401 determines that the following data is lossless encoded data of identification information, and runlength-decodes that data to generate 64-bit identification information. At this time, the first bit of the encoded data of the identification information is information indicating whether or not the identification information is runlength-encoded. Therefore, if that first bit indicates execution of runlength encoding, the CPU 1401 executes decoding processing; if that bit indicates non-execution of runlength-encoding, the CPU 1401 outputs the subsequent 64-bit data as identification information intact.

In step S40, the CPU 1401 determines that encoded data from the position after the runlength-encoded data to the end position of the fixed length is lossy encoded data of halftone image data, and executes JPEG decoding processing of that data to generate halftone image data for one component of one block. If the encoded data during the decoding processing exceeds the bit position indicated by the fixed length, the CPU 1401 determines that data after that encoded data is a value of encoded data with a quantized value "0", and decodes that data.

In step S41, the CPU 1401 substitutes pixel data having the extracted color by the extracted color in the decoded halftone image data based on the identification information, and outputs pixel data having non-extracted colors intact based on the identification information, thus reclaiming image data of the color component of interest of the block of interest.

After that, the process advances to step S42 to check if decoding of all the color components is complete. If NO is determined in step S42, the CPU 1401 repeats the processes in step S35 and subsequent steps. If it is determined that the decoding processing of all the components is complete, the process advances to step S43, and the CPU 1401 generates and outputs color image data for one block based on the decoding results of all the components, thus ending this processing.

The decoding processing for one block has been described. For example, when 2×2 blocks (image data of 16×16 pixels) are to be decoded, the positions of the respective blocks may be set to execute the processes in step S32 and subsequent steps. When all the blocks are to be decoded, the processes in step S32 and subsequent steps can be executed for each individual block.

As described above, according to this modification, the same processing as the image decoding apparatus according to the aforementioned first embodiment can be implemented by the computer program, and the same effects can also be provided.

Second Embodiment

Figure 8:
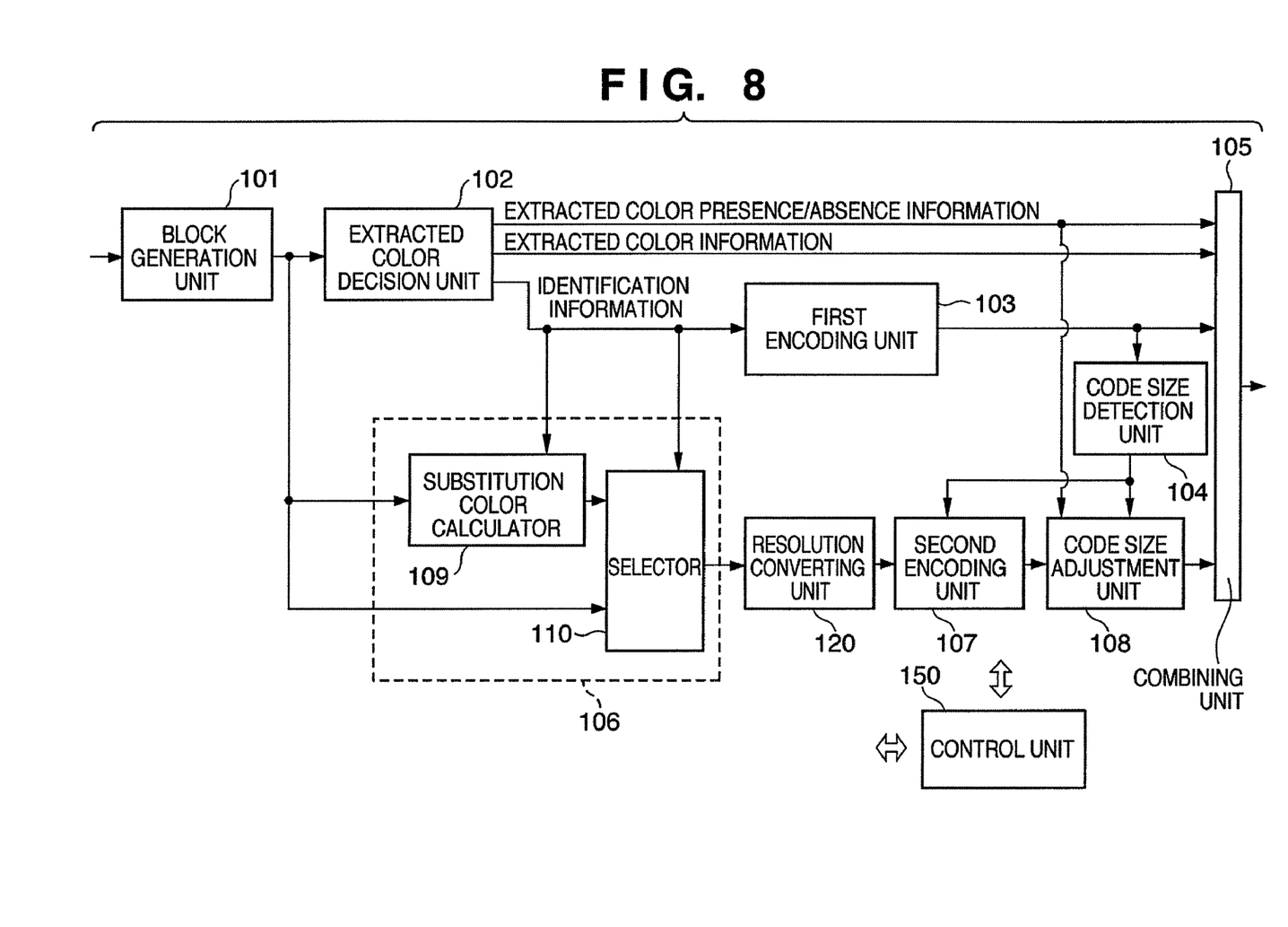
FIG. 8 is a block diagram showing the arrangement of an image encoding apparatus according to the second embodiment.

FIG. 8 is a block diagram showing the arrangement of an encoding apparatus according to the second embodiment. The differences between FIGS. 8 and 1 are that a resolution converting unit 120 is inserted between a substitution unit 106 and second encoding unit 107, and a block generation unit 101 extracts image data of 16×16 pixels from image data to be encoded. Since other components are the same as those in FIG. 1, they are denoted by the same reference numerals, and a detailed description thereof will not be repeated.

Note that since one block size is 16×16 pixels, an extracted color decision unit 102 generates identification information of 256 bits (=16×16).

The resolution converting unit 120 converts halftone image data of 16×16 pixels outputted from a selector 110 to have ½ resolutions in both the horizontal and vertical directions, thereby generating image data of 8×8 pixels. The resolution conversion itself can use a state-of-the-art technique. For example, in order to convert original image data to have ½ resolutions in both the horizontal and vertical directions, the average value of components of 2×2 pixels in the original image is calculated, and that average value can be outputted as a component value of one pixel after resolution conversion.

According to the second embodiment, a first encoding unit 103 lossless-encodes identification information of a block of 16×16 pixels, while the second encoding unit 107 lossy-encodes a sub-block of 8×8 pixels after resolution conversion. That is, the lossy-encoded data size of halftone image data generated from an original image to be encoded is smaller than that in the first embodiment.

Figure 9:
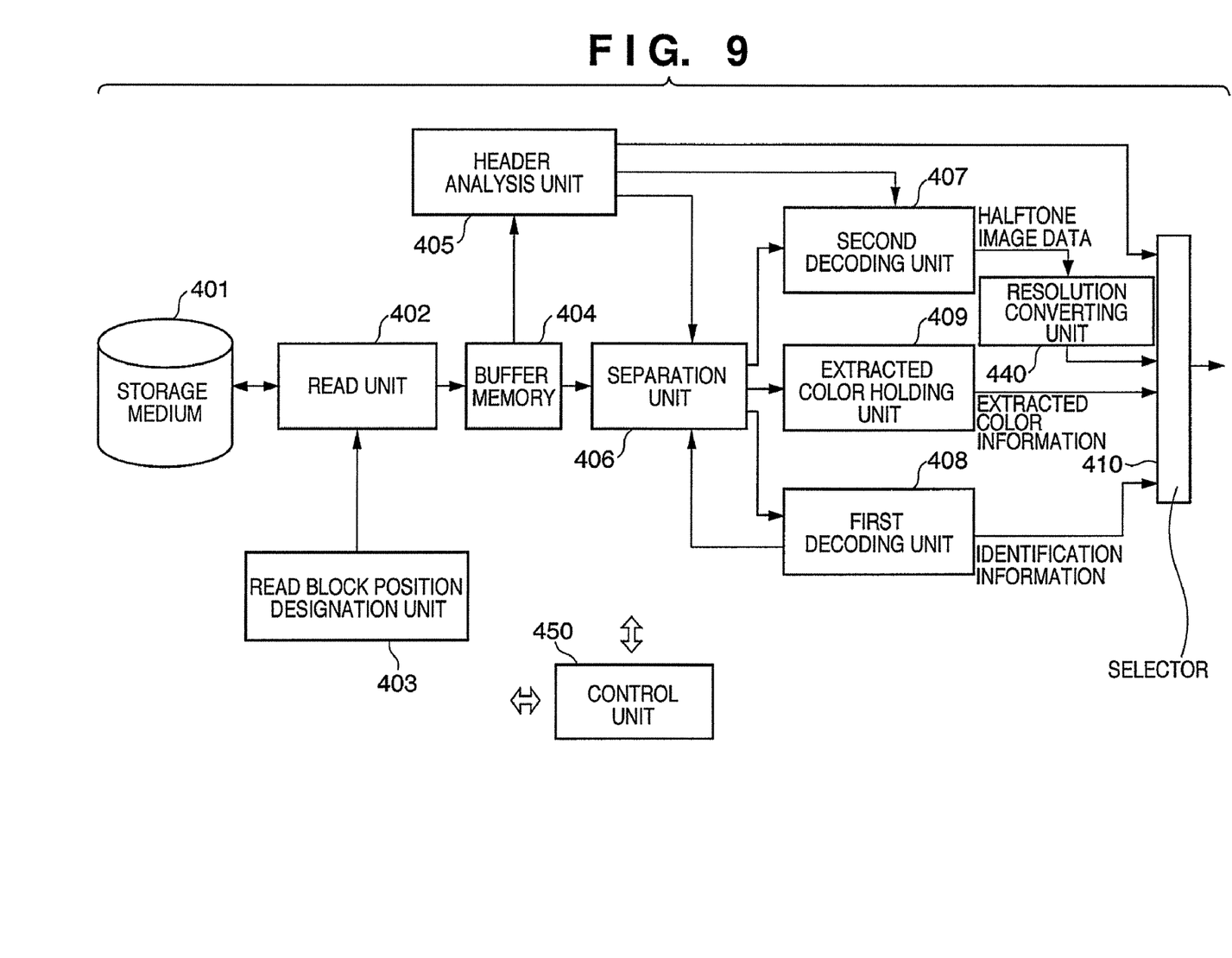
FIG. 9 is a block diagram showing the arrangement of an image decoding apparatus according to the second embodiment.

The encoding apparatus of the second embodiment has been described. A decoding apparatus according to the second embodiment has an arrangement shown in FIG. 9. That is, in the arrangement shown in FIG. 9, a resolution converting unit 440 for converting data to have ×2 resolutions in both the horizontal and vertical directions is arranged between a second decoding unit 407 and selector 410 in FIG. 4. As a technique for converting to the ×2 resolutions, for example, linear interpolation processing can be adopted.

Figure 6:
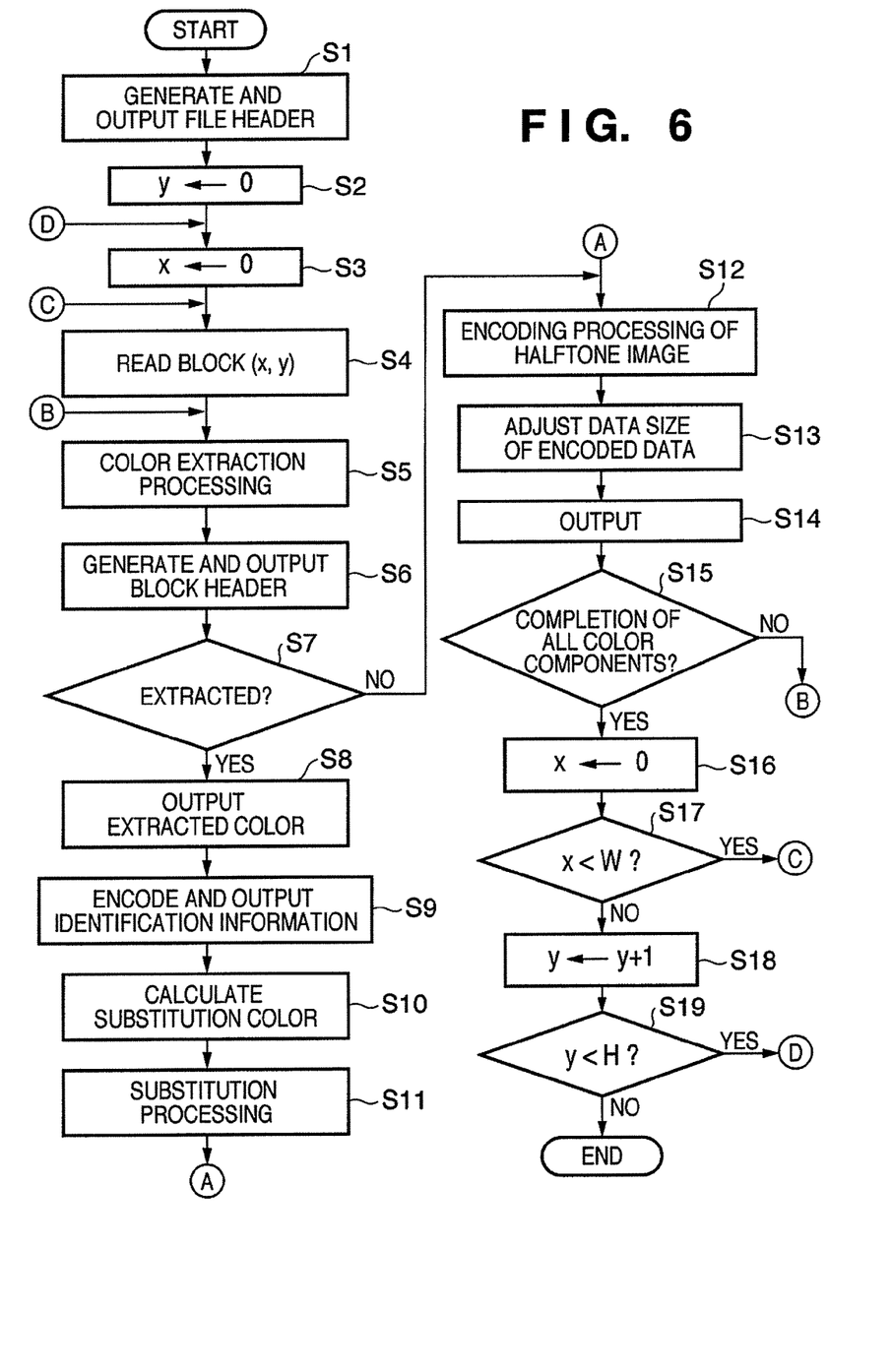
FIG. 6 is a flowchart showing the processing sequence of the image encoding apparatus.

In order to implement the encoding apparatus of the second embodiment by a computer program, ½ resolution conversion processing in both the horizontal and vertical directions can be added immediately before step S12 in the flowchart of FIG. 6. In case of an image decoding computer program, ×2 resolution conversion processing in both the horizontal and vertical directions can be added after steps S37 and S40 in FIG. 7.

In this embodiment, the resolution converting unit 120 adopts ½ resolution conversion as an example. However, ⅓ resolution conversion may be adopted, and other resolution conversion ratios may be adopted. However, when ⅓ resolution conversion is adopted, and the encoding unit 107 adopts JPEG encoding, the size of one block needs to be changed accordingly.

Other Embodiments

In the above embodiments, a size defined by the numbers of pixels in the horizontal and vertical directions of image data to be encoded is an integer multiple of the size of a block as a unit to be encoded by the encoding unit 107 which executes lossy encoding. However, such condition is used for the sake of simplicity, and that size need not always be an integer multiple. If the size defined by the numbers of pixels in the horizontal and vertical directions of image data to be encoded is not an integer multiple of the block size, dummy pixel data may be added upon encoding. In this case, the file header describes an original image size excluding the dummy data. Upon decoding pixels that exceed the size described in the file header, the decoding apparatus can determine them as dummy pixels, and can exclude these pixels from those to be outputted.

In the above embodiments, block encoded data as many as the number of color components are generated from one color image data. Alternatively, one block encoded data may be generated. In this case, encoded data of one block stores respective component data of an extracted color. In the above embodiments, one block size is 8×8 or 16×16 pixels. However, such block size does not limit the present invention. Also, the number of fixed length bits can be appropriately changed according to the block size.

In the above embodiments, the implementation example using the computer program has been explained. Normally, a computer program is stored in a computer-readable storage medium such as a CD-ROM or the like, and the storage medium is set in a reading device (CD-ROM drive or the like) of the computer so as to copy or install the computer program in a system. Therefore, such computer-readable storage medium falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117557, filed Apr. 26, 2007, which is hereby incorporated by reference herein in its entirety.

What is claimed is:

1. An image encoding apparatus for encoding image data, comprising:
   an input unit adapted to input image data for respective blocks each defined by a plurality of pixels;
   an extraction unit adapted to check if image data of each inputted block includes a pixel of a high frequency component, and to extract a color of that pixel as an extracted color;
   a generation unit adapted to generate identification information used to identify pixels having the extracted color and pixels having non-extracted colors in the block;
   a first encoding unit adapted to encode the generated identification information;

a calculation unit adapted to calculate substitution color data used to substitute pixel data having the extracted color based on pixel data of the non-extracted colors in the block;

a substitution unit adapted to substitute the pixel data having the extracted color by the substitution color data calculated by said calculation unit;

a second encoding unit adapted to encode image data of the block obtained by substitution of said substitution unit;

a detection unit adapted to detect a data size of encoded data generated by said first encoding unit;

a data size suppression unit adapted to suppress a data size of encoded data generated by said second encoding unit based on the data size detected by said detection unit; and a combining unit adapted to combine and output information of the extracted color, the encoded data generated by said first encoding unit, and the encoded data output from said data size suppression unit, wherein at least one of the foregoing units is implemented by a processor.

2. The apparatus according to claim 1, wherein said first encoding unit executes runlength encoding, and said second encoding unit executes JPEG encoding.

3. The apparatus according to claim 1, further comprising a resolution converting unit adapted to generate image data of a block having a resolution lower than a resolution of the block after substitution by said substitution unit, wherein said second encoding unit encodes image data of the block converted by said resolution converting unit.

4. A method of controlling an image encoding apparatus for encoding image data, comprising:

an input step of inputting image data for respective blocks each defined by a plurality of pixels;

an extraction step of checking if image data of each inputted block includes a pixel of a high frequency component, and extracting a color of that pixel as an extracted color;

a generation step of generating identification information used to identify pixels having the extracted color and pixels having non-extracted colors in the block;

a first encoding step of encoding the generated identification information;

a calculation step of calculating substitution color data used to substitute pixel data having the extracted color based on pixel data of the non-extracted colors in the block;

a substitution step of substituting the pixel data having the extracted color by the substitution color data calculated in the calculation step;

a second encoding step of encoding image data of the block obtained by substitution in the substitution step;

a detection step of detecting a data size of encoded data generated in the first encoding step;

a data size suppression step of suppressing a data size of encoded data generated in the second encoding step based on the data size detected in the detection step; and a combining step of combining and outputting information of the extracted color, the encoded data generated in the first encoding step, and the encoded data output from the data size suppression step.

5. A computer program stored in a computer-readable storage medium to make a computer function as an image encoding apparatus according to claim 1, when the computer loads and executes said program.

6. A decoding apparatus for decoding encoded image data generated by an image encoding apparatus according to claim 1, said apparatus comprising:

a position designation unit adapted to designate a position of a block to be decoded;

a calculation unit adapted to calculate a read position in the encoded image data based on the designated position of the block;

a reading unit adapted to read out encoded image data of a data size corresponding to a fixed length from the calculated position;

a decoding unit adapted to decode the readout encoded data to generate an extracted color, identification information, and image data of a block after substitution; and an output unit adapted to output the extracted color as a decoding result at a pixel position having the extracted color based on the identification information in the image data obtained by said decoding unit, and to output pixel data in the decoded block as a decoding result at a pixel position having a non-extracted color based on the identification information, wherein at least one of the foregoing units is implemented by a processor.

7. A method of controlling a decoding apparatus for decoding encoded image data generated by an image encoding apparatus according to claim 1, said method comprising:

a position designation step of designating a position of a block to be decoded;

a calculation step of calculating a read position in the encoded image data based on the designated position of the block;

a reading step of reading out encoded image data of a data size corresponding to a fixed length from the calculated position;

a decoding step of decoding the readout encoded data to generate an extracted color, identification information, and image data of a block after substitution; and an output step of outputting the extracted color as a decoding result at a pixel position having the extracted color based on the identification information in the image data obtained in the decoding step, and outputting pixel data in the decoded block as a decoding result at a pixel position having a non-extracted color based on the identification information.

8. A computer program stored in a computer-readable storage medium to make a computer function as a decoding apparatus according to claim 6, when the computer loads and executes said program.

9. A computer-readable storage medium storing a computer program according to claim 5.

10. A computer-readable storage medium storing a computer program according to claim 8.

* * * * *